United States Patent [19]

Yoshida

[11] Patent Number: 4,703,282
[45] Date of Patent: Oct. 27, 1987

[54] DIGITAL DEMODULATION SYSTEM

[75] Inventor: Yasuharu Yoshida, Tokyo, Japan

[73] Assignee: NEC Corporation, Tokyo, Japan

[21] Appl. No.: 878,746

[22] Filed: Jun. 26, 1986

[30] Foreign Application Priority Data

Jun. 29, 1985 [JP] Japan .................................. 60-141529
Jul. 10, 1985 [JP] Japan .................................. 60-149931

[51] Int. Cl.$^4$ .............................................. H03D 3/18
[52] U.S. Cl. ...................................... 329/50; 329/124;
329/131; 375/80; 375/101
[58] Field of Search .................. 329/50, 110, 122, 124,
329/131, 135; 375/39, 78, 80, 98, 101

[56] References Cited

U.S. PATENT DOCUMENTS 4,574,246  3/1986  Yoshida ............................ 329/50 X
4,620,159 10/1986  Yoshida et al. ...................... 329/50
4,631,488 12/1986  Yoshida ............................ 375/39 X Primary Examiner—Eugene R. LaRoche
Assistant Examiner—David Mis
Attorney, Agent, or Firm—Sughrue, Mion, Zinn, Macpeak and Seas

[57] ABSTRACT

An AGC circuit for controlling an input level of a multi-level discriminator to an optimum one and a transversal equalizer capable of fully exhibiting an equalizing function thereof, each being installed in a digital demodulation system applicable to a multi-level communication system. The AGC circuit eliminates false pull-in to promote stable pull-in operations and is applicable not only to baseband signals having two or more levels but also to a 16 QAM system in microwave digital communication. Even when a demodulator is in an asynchronous state and input signals have significant intersymbol interference, the demodulation system is capable of being restored to normal to allow the equalizer to fully exhibit its capability.

2 Claims, 13 Drawing Figures

DIGITAL DEMODULATION SYSTEM

BACKGROUND OF THE INVENTION

The present invention relates to a digital demodulation system for use in a multi-level communication system and, more particularly, to an automatic gain control (AGC) circuit for controlling an input level of a multi-level discriminator to an optimum one and a transversal equalizer capable of exhibiting a sufficient equalizing ability.

While various kinds of microwave digital communication systems have been put to practical use, a predominant one is a high multi-level quadrature amplitude modulation (QAM) system. Although the high QAM system is effective to increase the amount of information that can be transmitted, it renders an apparatus design complicated and requires various circuits to be furnished with strict characteristics. One of such characteristics is the AGC characteristic which is set up in order that in a demodulator a demodulated multi-level signal may be controlled to an optimum input level of a multi-level discriminator. A construction elaborated to implement the strict AGC characteristic is disclosed in, for example, Japauese Unexamined Patent Publication No. 57-131152. However, the problem with the disclosed construction is that during the course of a pull-in a false or abnormal pull-in occurs from time to time although it may successfully control the input level of the discriminator to an optimum one. Assuming an 8-levels demodulated signal, for example, false pull-in occurs at levels which are deviated from a normal level by 7/5, 7/3, 7/9 and 7/11, preventing accurate main data signals from being recovered.

Meanwhile, a 16 QAM and other multi-level digital modulation systems are capable of transmitting information with high efficiencies but are quite susceptive to various distortions which are particular to transmission paths, thus severely suffering from fading. A transversal equalizer is an effective countermeasure against fading heretofore known in the art and is beginning to be regularly equipped with in high-efficiency communication systems. Generally, a transversal equalizer should preferably have such an equalizing characteristic that a limit equalizing ability under a condition wherein transmission distortions (intersymbol interference) are increased from relatively small ones and a limit equalizing ability under a condition wherein transmission distortions that are large enough to render the equalizer practically inoperable are sequentially reduced until the equalizer is restored to operable are equal to each other. At the present stage of technology, however, the limit equalizing ability in the second-mentioned condition is significantly small. This suggests that potential capability of a transversal equalizer is not fully exhibited.

SUMMARY OF THE INVENTION

It is therefore a first object of the present invention to provide an AGC circuit capable of eliminating a false pull-in to thereby promote stable pull-in operations.

It is a second object of the present invention to provide a digital demodulation system which includes a transversal equalizer and a demodulator each being capable of exhibiting an ability thereof sufficiently.

It is a third object of the present invention to provide a generally improved digital modulation system.

In one aspect of the present invention, there is provided an automatic gain control circuit for controlling an input level of a multi-level discriminator to an optimum level to discriminate a multi-level baseband signal in terms of multiple levels. The circuit comprises a variable attenuator responsive to one of an intermediate frequency band or a baseband and interconnected to the multi-level discriminator for varying an input level of the discriminator, and identifying circuit for identifying in response to an output of the multi-level discriminator a first to a third regions which are set up in such a manner as to include Outermost points and an inntermost point with respect to a demodulated signal, and a logic circuit for subjecting one of an output of the identifying circuit and an output of the identifying circuit which includes the multi-level discriminator to generate a control signal for controlling the variable attenuator.

In another aspect of the present invention, there is provided a digital demodulation system which includes a demodulator and a transversal equalizer to demodulate a multi-level digital modulated wave for thereby producing a demodulator output which consists of main data signals and error signals. The system comprises a decision circuit for deciding whether respective signal points of the multi-level digital modulated wave are positioned in regions A and A' are predetermined in conformity to a state of signal point arrangement, and a logic circuit for, in a carrier asynchronous state of the demodulator, logically manipulating an output of the decision circuit and an output of the demodulator to generate control signals for controlling respective taps of a real number portion of the transversal equalizer.

The above and other objects, features and advantages of the present invention will become more apparent from the following detailed description taken with the accompanying drawings.

DESCRIPTION OF THE PREFERRED EMBODIMENTS

Some embodiments of the present invention which are directed to achieving the first object as previously stated will be described first.

To better understand the present invention, a brief reference will be made to a prior art AGC circuit. Shown in FIG. 1. The prior art AGC circuit, generally 10, comprises a baseband variable attenuator (ATT) 12, a 4-bits analog-to-digital (AD) converter 14, an exclusive OR (Ex-OR) gate 16, and a low pass filter (LPF) 18. An 8-bits baseband signal, which is an input signal, is applied to the AD converter 14 via the ATT 12. In response, the AD converter 14 regenerates main data signals D1 to D3, and an error signal D4. The signals D1 and D4 are routed to the Ex-OR gate 16 which then produces a signal C1. The signal C1 is fed as a control signal to the ATT 12 via the LPF 18 so as to control the input level of the AD converter 14 to an optimum one.

Figures 1, 2:
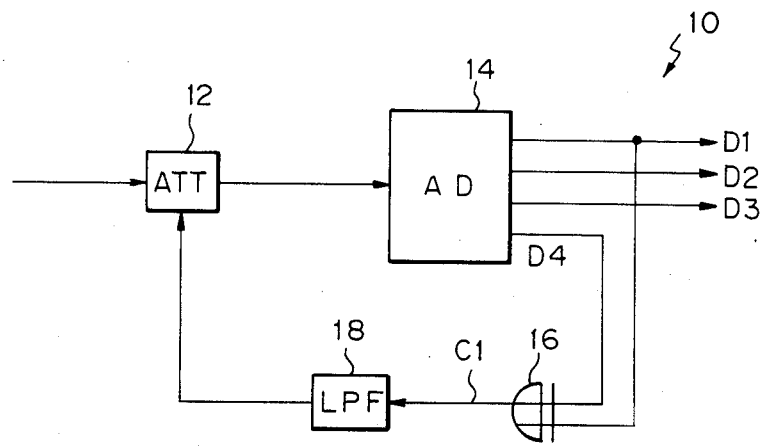
FIG. 1 is a block diagram showing an example of prior art AGC circuits.
FIG. 2 is a chart for demonstrating the operation of the AGC circuit of FIG. 1.

Referring to FIG. 2, a chart representative of the operation of the AGC circuit 10 is shown. In FIG. 2, the 8-levels baseband signal is designated by d1 to d8 and the data outputted by the Ex-OR gate 16 by C1. When the input data d1 to d8 are remote from the center, or zero volt, i.e., when the demodulation level is increased, all the outputs C1 become logical ZEROs; when the demodulation level is decreased, the outputs C1 become ONEs. This teaches that the output C1 serve as an error signal associated with the AGC circuit 10.

A false pull-in phenomenon will be described next. Assume that a modulated signal d'1 to d'8 having a value which is 7/9 of a regular level is initially applied to the AD converter 14. In this condition, ZEROs and ONEs appear with the same probability on the output C1 of the Ex-OR gate 16, so the error signals nominally appear stable and the circuit 10 does not behave to restore the demodulated signal to the regular level. In this manner, once entered into d'1 to d'8 as shown in FIG. 2, the demodulated signak cannot get out thereof, resulting in a false pull-in.

Figure 3:
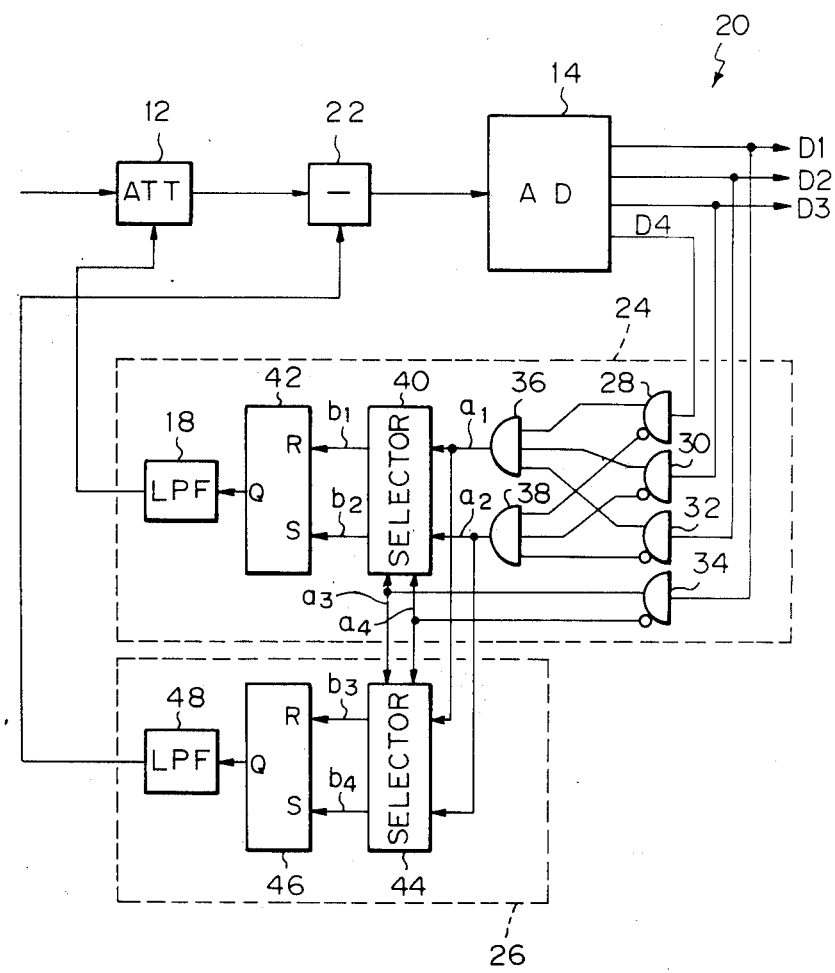
FIG. 3 is a block diagram showing an embodiment of the present invention which is elaborated to achieve the first object as previously stated.

Referring to FIG. 3, an AGC circuit in accordance with one embodiment of the present invention is shown. The AGC circuit, generally 20, includes an ATT 12, an AD converter 14 and a LPF 18 which share the same functions as those of the prior art AGC circuit 10. A subtractor 22 is interconnected between the ATT 12 and the AD converter 14, and a logic circuit 24 between the AD converter 14 and the ATT 12. Further, a second logic circuit 26 is interconnected between the logic circuit 24 and the subtractor 22. The logic circuit 24 comprises an OR/NOR gates 28, 30, 32 and 34, AND gates 36 and 38, a selector 40, a flip-flop 42, and a LPF 18. The other logic circuit 26, on the other hand, comprises a selector 44, a flip-flop 46, and a LPF 48. A demodulated signal is routed through the ATT 12 and subtractor 22 to the AD converter 14 to be thereby converted to data sequences D1 to D4. When the demodulated signal inputted is at regular levels as represented by d1 to d8 in FIG. 2. the AD converter 14 produces signals D1 to D4 as shown on the right-hand side in FIG. 2. The first logic circuit 24 is adapted to produce an error signal which is the characteristic feature of this particular embodiment. As shown in FIG. 2, three different signal regions 1 to 3 are defined. When the demodulated signal has entered the signal regions 1 and 3, the logic circuit 24 controls the ATT 12 to reduce the demodulated signal. Conversely, when the demodulated signal has entered the region 2, the logic circuit 24 delivers to the ATT 12 a control signal for magnifying the demodulated signal. This allows the demodulated signal to be stabilized in the regular state as shown in FIG. 2, in which d1 contacts the region 1, d4 and d5 contacts the region 2. and d8 contacts the region 3. When the demodulated signal d'1 to d'8 has initially been applied to the AD converter 14, d'4 and d'5 enter the region 2 but not the regions 1 and 3. As a result, the demodulated signal is sequentially increased by the ATT 12 until d'1 and d'8 respectively enter the regions 1 and 3 and, thereafter, they are stabilized at the points d1 to d8. The circuit 20 with such a construction is free from false pull-in.

Referring to FIG. 3, a signal b1 becomes a ONE in response to the regions 1 and 3 so as to reset the flip-flop 42 and, thereby, make an output of the flip-flop 42 a ZERO. A signal b2 becomes a ONE in response to the region 2 to set the flip-flop 42 to turn an output thereof into a ONE. Here, let a ONE be a positive voltage and a ZERO a negative voltage. Then, if the ATT 12 has such a characteristic that the amount of attenuation is decreased in response to a positive voltage and increased in response to a negative voltage, the above-stated operation is accomplished by applying an output of the flip-flop 42 to the ATT 12 via the LPF 18 which is adapted for jitter suppression. The second logic circuit 26 and the subtractor 22 in combination constitute a circuit for compensating for DC drifts as are contained in a demodulated signal on the input of the AD converter 14. For details of operation of such a circuit, a reference may be made to Japanese Unexamined Patent Publication No. 59-174058. It is to be noted that this DC voltage control circuit is not essential although preferable for more accurate operation of the AGC circuit 20.

In FIG. 2, the reions 1 to 3 are shown in relation to an 8-levels demodulated signal; the region 1 contacting d1 from outside, the region 2 contacting d4 and d5 from inside, and the reion 3 contacting d8 from outside. However, as the number of levels is increased such as to sixteen levels, simply defining the regions 1 to 3 at the outermost points and innermost point excessively limits the number of signal points which are available for control. The increase in the number of levels may be coped with by defining several zones inclusive of the outermost and innermost points so as to increase the number of signals available for control while preserving the advantage of the present invention.

Figure 4:
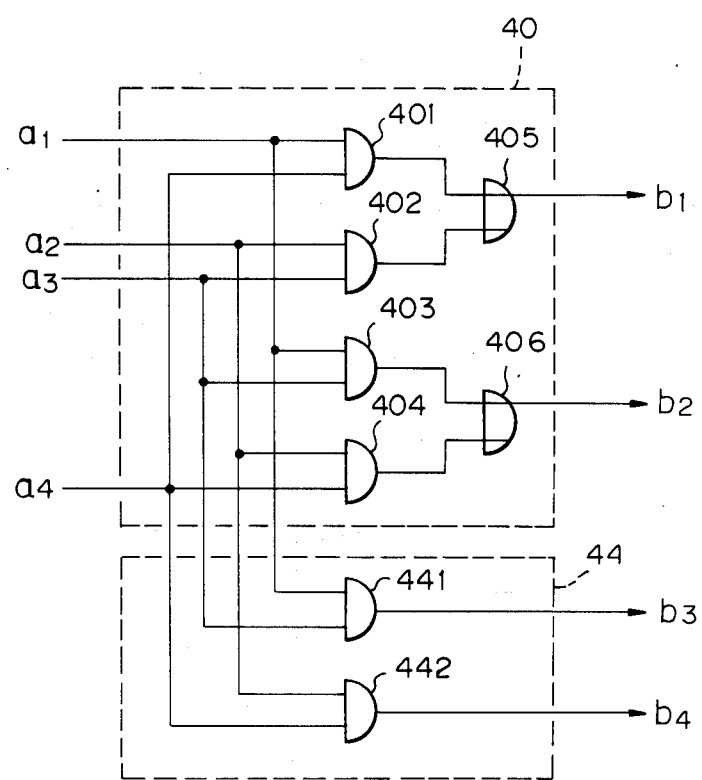
FIG. 4 is a diagram showing specific constructions of selectors which are included in the embodiment of FIG. 3.

Referring to FIG. 4, specific constructions of the selectors 40 and 44 as shown in FIG. 3 are shown. The selector 40 is made up of AND gates 401 to 404 and OR gates 405 and 406. The selector 44, on the other hand, is made up of AND gates 441 and 442.

Figure 5:
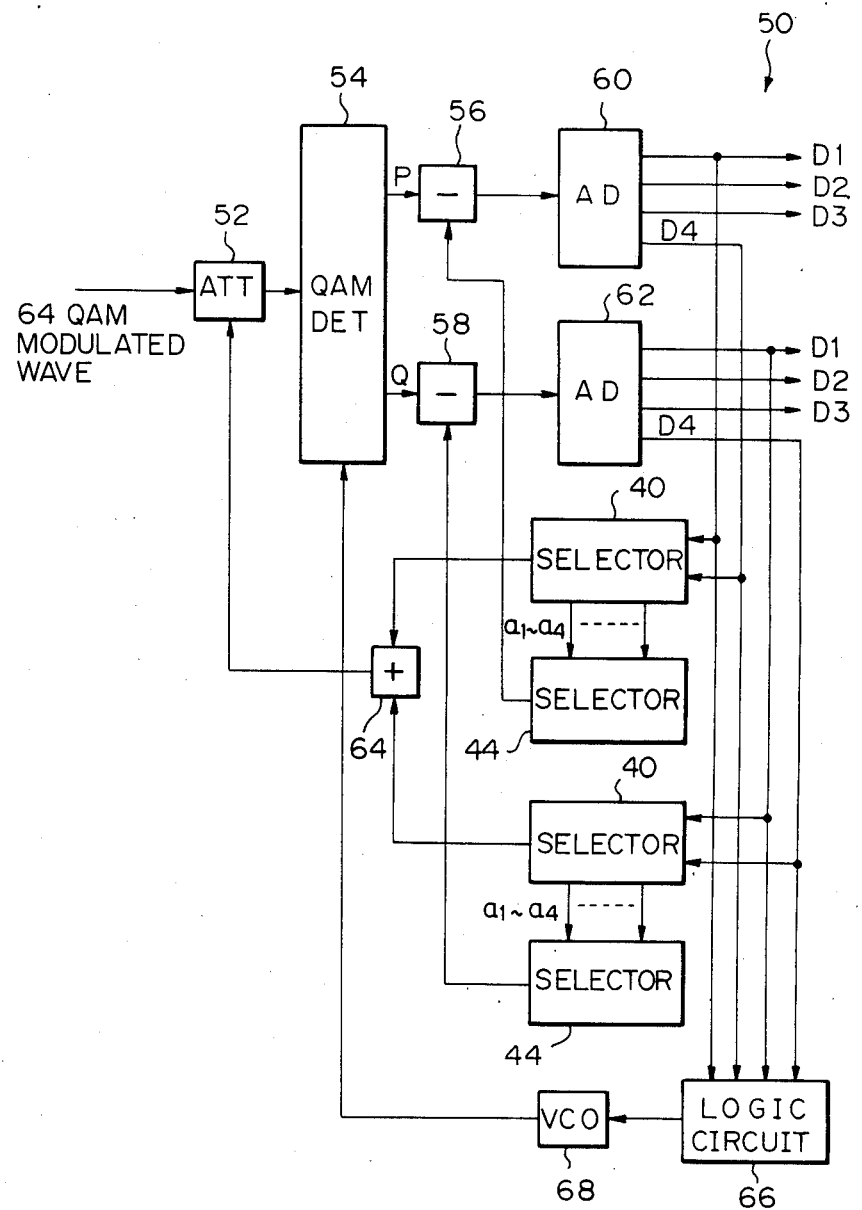
FIG. 5 is a block diagram showing another embodiment of the present invention which is applied to a 64 QAM demodulator.

Referring to FIG. 5, another embodiment of the present invention which is applied to a 64 QAM demodulator is shown. The AGC circuit shown in FIG. 5 and generally designated by the reference numeral 50 comprises an intermediate frequency (IF) band variable attenuator 52, a quadrature detector 54, substractors 56 and 58, 4-bits AD converters 60 and 62, an adder 64, a logic circuit 66, a voltage controlled oscillator (VCO) 68, and selectors 40 and 44. In this particular embodiment, a 64 QAM modulated wave is routed via the variable attenuator 52 to the quadrature detector 54 to be detected and thereby converted to 8-levels demodulated signals as represented by P and Q. Because the signals P and Q are exactly the same as the input signals as shown in FIG. 3, the operations of the subtractors 56 and 58 to the selectors 40 and 44 of the logic circuits 24 and 26 are almost the same as those previously described. The difference is that in FIG. 5 outputs of the selectors 40 and 44 are added by the adder 64, so the variable attenuator 52 may be controlled by the resultant sum.

The variable attenuator 52 may be replaced with two such attenuators which are assigned one to the baseband of P and the other to that of Q. Further, one baseband variable attenuator and one IF band variable attenuator may be assigned to one of P and Q, as disclosed in Japanese Unexamined Patent Publication No. 59-169256. A reference carrier wave which is necessary for quadrature detection is regenerated by the logic circuit 66 and VCO 68. For details of such regeneration, a reference may be made to Japanese Unexamined Patent Publication 57-131151.

Figure 6:
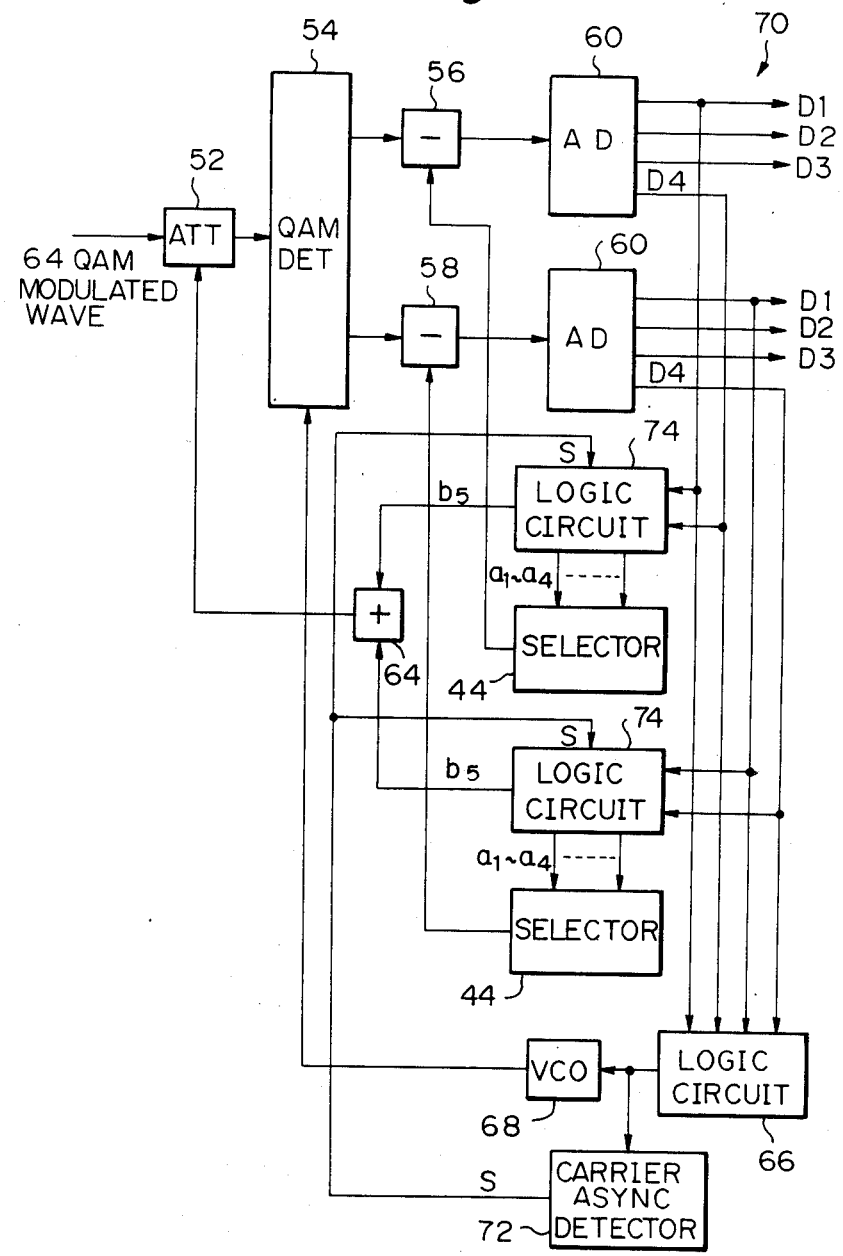
FIG. 6 is block diagram showing another embodiment of the present invention which is also applied to a 64 QAM demodulator.

Referring to FIG. 6, another embodiment of the present invention which is also applied to a 64 QAM demodulator is shown. The AGC circuit, generally 70, is substantially the same in construction and operation as the AGC circuit 50 of FIG. 5 except for a carrier asynchronism detection circuit 72 and logic circuits 74. The AGC circuit 70 is constructed to switch control signals from one to the other depending upon the steady/transitional state of the 64 QAM demodulator. Specifically, whether the demodulator is in a steady state or in a transitional state is determined by checking whether the carrier asynchronism detection circuit, or detector, 72 is in a synchronous state or in an asynchronous state. Then, if it is in a transitional state, control signals in accordance with this embodiment are used in order to avoid false pull-in and, if it is in a steady state, prior art control signals. The advantage attainable with such a construction is that because in a steady state which is free from the possibility of false pull-in all the signals are used as control signals, use can be made of prior art control signals which have an excellent jitter characteristic. As previously stated, the number of signal points usable as control signals of the present invention decreases with the increase in the number of levels, preventing the jitter characteristic from being deteriorated. The carrier asynchronism detector 72 may be implemented with a detector of the type utilizing the fact that the loop impedance of a carrier synchronizing circuit is high under an asynchronous state and low under a synchronous state.

Figure 7:
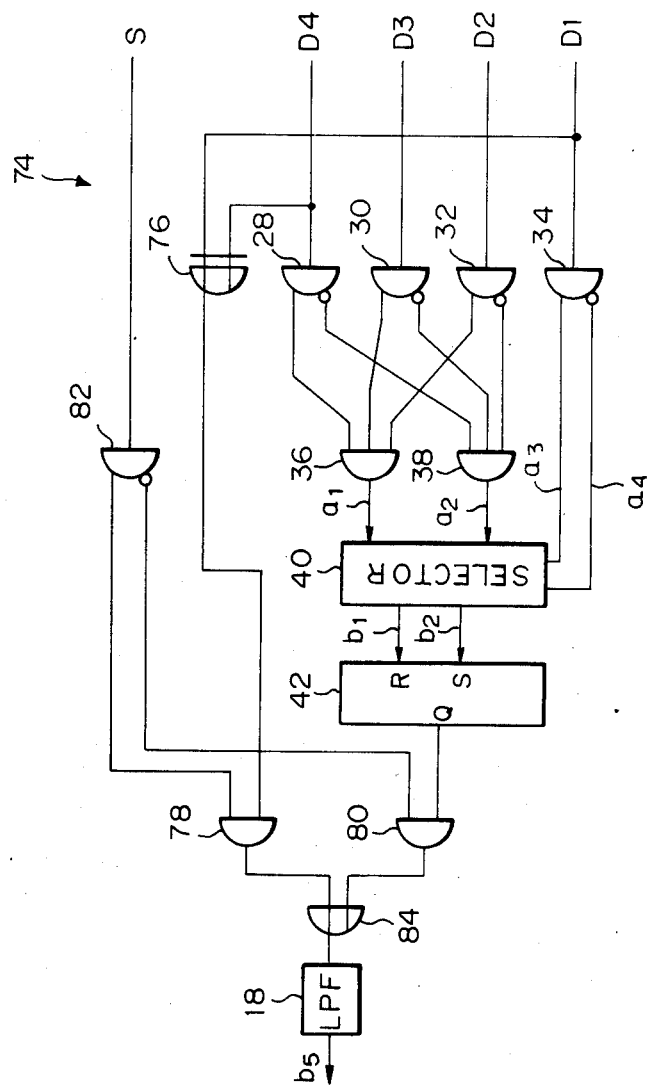
FIG. 7 is a diagram showing a specific construction of a logic circuit as shown in FIG. 6.

Referring to FIG. 7, a specific construction of the logic circuits 74 as shown in FIG. 6 is shown. In FIG. 7, the same or similar structural elements as those of FIG. 3 are designated by like reference numerals. The logic circuit 74 comprises an Ex-OR gate 76, AND gates 78 and 80, and OR gates 82 and 84. The output of the Ex-OR gate 76 is a prior art control signal while the output of the flip-flop 42 is a control signal in accordance with the present invention. The two outputs are switched from one to the other by a switching signal S.

In the embodiment of FIG. 6, while the demodulator is in a transitional state, an AGC signal b5 is outputted when the output states of P and Q are in the signal regions 1 to 3 of FIG. 2. Alternatively, an arrangement may be made such that the control signal b5 is outputted only when the output states of P and Q enter the regions 1 to 3 at the same time. This alternative scheme is advantageous in that even in a transitional state of the demodulator the signals (d1, d4, d5 and d8) can be identified and regenerated in the same conditions as during a steady state, enhancing the pull-in characteristic during a transitional state.

While the embodiments of FIGS. 3 and 5 have been shown and described in relation to an 8-levels baseband signal, such is only illustrative and they are naturally applicable to baseband signals having two or more levels.

It will be seen from the foregoing that the embodiments of the present invention elaborated to achieve the first object as previously stated eliminate false pull-in to ensure stable pull-in operations and are applicable to baseband signals having two or more levels as well as to a 16 QAM system in microwave digital communication, enhancing reliability of operation of such systems.

Some embodiments which are elaborated to achieve the second embodiment of the present invention will be described in detail.

Figure 8:
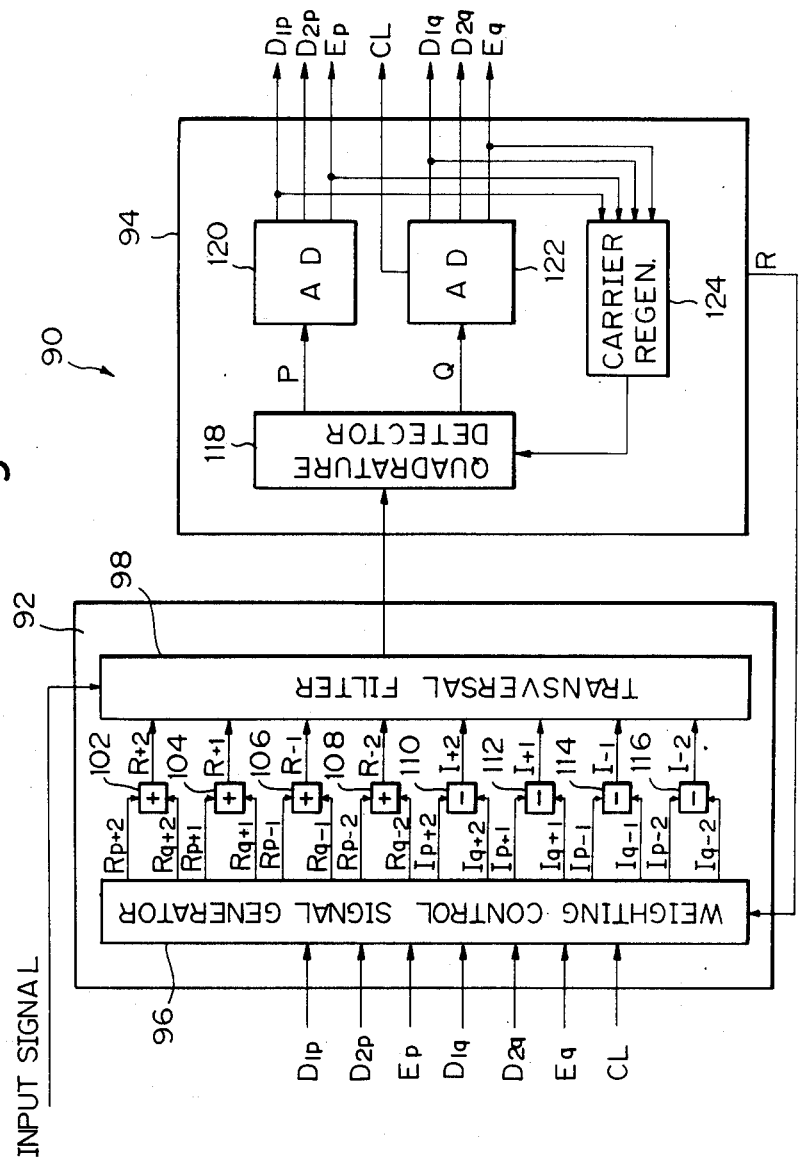
FIG. 8 is a block diagram of a digital demodulation system to which another embodiment of the present invention elaborated to achieve the second embodiment is applicable.
Figure 9:
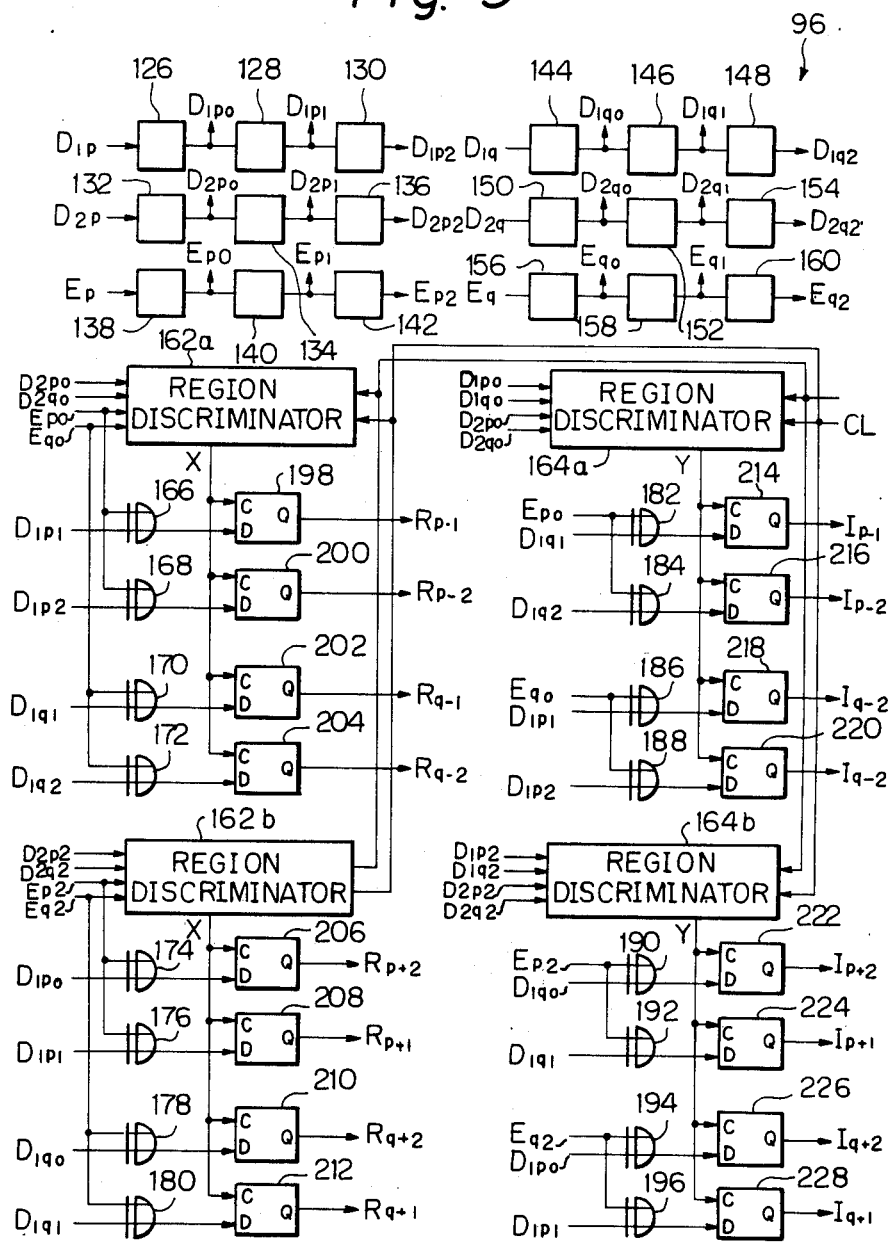
FIG. 9 is a diagram showing a specific construction of a weighting control signal generator as shown in FIG. 8.
Figure 10:
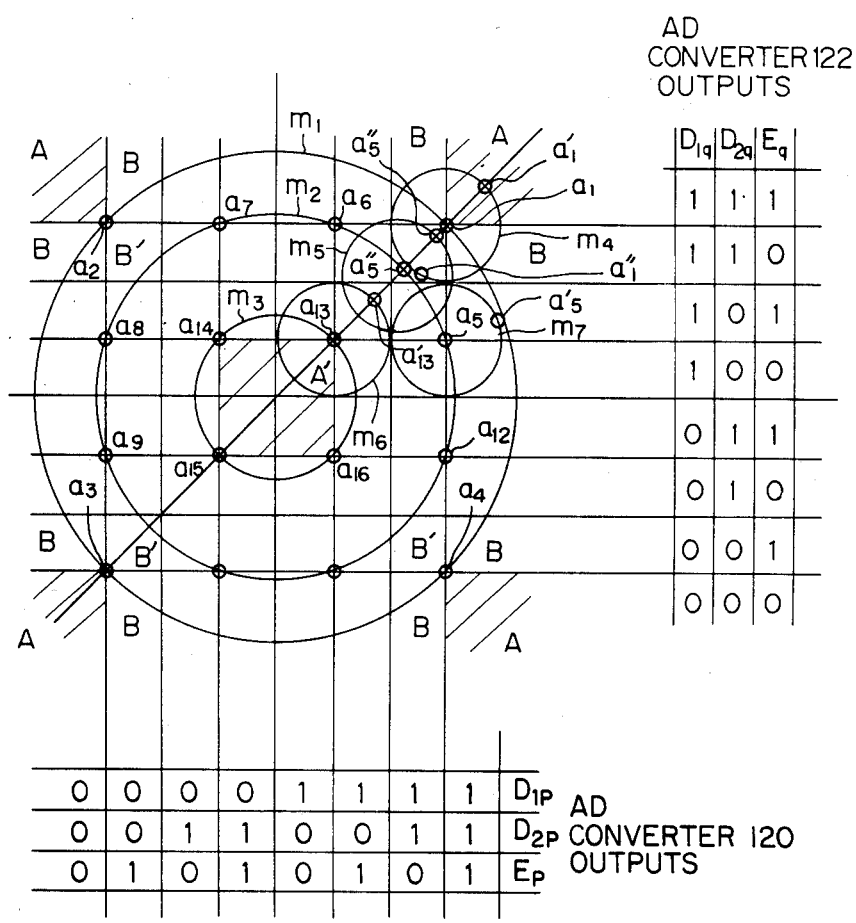
FIG. 10 is a chart for demonstrating the operation of the embodiment of FIG. 8.

Referring to FIG. 8, an exemplary digital demodulation system to which the present invention is applicable is shown. The system of FIG. 8, generally 90, comprises an IF band transversal equalizer 92 and a demodulator 94. The equalizer 92 is made up of a weighting control signal generator 96, a transversal filter 98, adders 102, 104, 106 and 108, and substractors 110, 112, 114 and 116. The demodulator 94, on the other hand, is made up of a quadrature detector 118, 3-bits AD converters 120 and 122, and a carrier regenerator 124. An exemplary construction of the weighting control signal generator 96 is shown in FIG. 9. As shown in FIG. 9, the generator 96 comprises 1-bit delay lines 126, 128, 130, 132, 134, 136, 138, 140, 142, 144, 146, 148, 150, 152, 154, 156, 158 and 160, region discriminators 162a, 162b, 164a and 164b, Ex-OR gates 166, 168, 170, 172, 174, 176, 178, 180, 182, 184, 186, 188, 190, 192, 194, and 196, and D-type flip-flops 198, 200, 202, 204, 206, 208, 210, 212, 214, 216, 218, 220, 222, 224, 226 and 228. FIG. 10 is a chart demonstrating the operation of this particular embodiment. FIG. 8 shows a demodulation system of the type using a 5-taps IF band transversal equalizer which is applicable to 16 QAM demodulated signals. Such a system will be described hereinafter.

An input signal, or 16 QAM modulated wave, is applied to the transversal filter 98 which is made up of a delay circuit and a weighting circuit. The transversal filter 98 functions to compensate for intersymbol interference which is contained in the input signal. The weighting circuit is controlled by signals $R\pm 1$, $R\pm 2$ $I\pm 1$ and $I\pm 2$ which are results of addition or substraction of the outputs of the weighting control signal generator 96. The basic operation of the transversal equalizer is disclosed in, for example, a paper entitled "Demodulator with 4/5 GHz 16 QAM 200 Mb/s Transversal Equalizer" which was presented at the 1984 National Meeting of Institute of Electronic Engineers. Communications Section, No. 628.

The output of the transversal equalizer 92 is applied to the demodulator 94 and detected by the quadrature detector 118. thereby being turned into demodulated baseband signals P and Q. The baseband signals P and Q are converted to digital signals by the 3-bits AD converters 120 and 122, respectively. Then, the AD converter 120 regenerates main signals $D_{1p}$ and $D_{2p}$ and an error signal $E_p$ while the AD converter 122 regenerates main signals $D_{19}$ and $D_{29}$ and an error signal $E_9{}^l$. The regenerated signals and the input signals are related as shown in FIG. 10. In FIG. 10, $a_1$ to $a_{18}$ are representative of the input signals, $D^9$, $D_{29}$ and $E_9$ the outputs of the AD converter 122, and $D_{1p}$, $D_{2p}$ and $E_p$ the outputs of the AD converter 120. All the regenerated signals are applied to the weighting control signal generator 96 to generate control signals. A part of the regenerated signals is applied to the carrier regenerator 124 to recover a reference carrier wave which is necessary for synchronous detection. The construction and operation of the circuit 124 is described in detail in Japanese Patent Application No. 56-15775 and, therefore, description thereof will be omitted herein. A reset signal R outputted by the carrier regenerator 124 is a signal adapted to show whether the regenerator 124 is in a synchronous state or in an asynchronous state and is applied to the weighting control signal generator 96.

The weighting control signal generator 96 is one of characteristic features of the present invention and will be described in detail hereinafter.

The construction shown in FIG. 9 includes region discriminators 162a, 162b, 164a and 164b and D-type flip-flops 198, 200, 202, 204, 206, 208, 210, 212, 214, 216, 218, 220, 222, 224, 226, and 228 which serve as storages, in addition to various elements as customarily built in. First, a drawback particular to a prior art construction will be discussed. In FIG. 10, assume that the signals as represented by $a_1$ to $a_{16}$ have intersymbol interference as represented by circles $m_4$ to $m_6$, and that the demodulator 94 is in an asynchronous state. Then, the signals $a_1$ to $a_{16}$ go round the circles $m_1$ to $m_3$. Assuming that the respective signals are subjected to intersymbol interference of real number portions (identical in phase and polarity), the signals $a_1$, $a_5$ and $a_{13}$, for example, are shifted to $a'_1$, $a'_5$ and $a'_{13}$, respectively. Meanwhile, if the demodulator 94 is in a synchronous state, the signals $a_1$, $a_5$ and $a_{13}$ respectively remain in the positions $a'_1$, $a'_5$ and $a'_{13}$ and in this condition, correct error signals are produced to promote convergence.

However, while the demodulator 94 is in an asynchronous state, the respective signal points go around the circles $m_1$ to $m_3$ with the result that the signal $a'_5$ enter the position $a'''_5$. In this condition, $a'''_5$ lies in the signal region of $a_1$, so the signal $a_1$ appears as if it were a signal $a''_1$ which has been subjected to intersymbol interference of the same phase and the opposite polarity. The result is the generation of incorrect error signals. Such an operation applies to all the signals $a_5$, to $a_{12}$ having middle levels. In this situation, the incorrect error signals become greater than the correct ones to cause the weighting control signal generator 96 associated with real number portions to malfunction, thereby preventing the prior art digital demodulation system from being restored to normal. The same mechanism of malfunction applies to a weighting control signal generator which is associated with imaginary number portions.

The region discriminators 162a, 162b, 164a and 164b and the storages 198, 200, 202, 204, 206, 208, 210, 212, 214, 216, 218, 220, 222, 224, 226 and 228 as shown in FIG. 9 serve to eliminate the above-discussed malfunction. The region discriminators 162a and 162b are adapted to identify the outermost regions A and the innermost region A' on the diagonal as shown in FIG. 10. The region discriminators 162a and 162b respectively generate clock pulses when the signals $a_1$ to $a_4$ are subjected to interference of the same phase and the same polarity and when the signals $a_{13}$ to $a_{16}$ are subjected to interference of the same phase and the opposite polarity. Outputs of the Ex-OR gates 166, 168, 170, 172, 174, 176, 178 and 180 produced then are read by their associated flip-flops 198, 200, 202, 204, 206, 208, 210 and 212. On the other hand, while the region discriminators 162a and 162b produce no output, the flip-flops mentioned above hold information previously stored therein. Hence, those flip-flops are capable of producing error signals from only those signals which entered the regions A and A'. Stated another way, because the flip-flop outputs do not contain incorrect error signals derived from the signals $a_5$ to $a_{12}$ having middle levels as previously mentioned, correct error signals are constantly produced despite intersymbol interference of the degree as represented by circles $m_4$ to $m_7$ in FIG. 10.

The region discriminators 164a and 164b are adapted to discriminate the regions A and regions B and B' which neighbor each of the regions A. The discriminators 164a and 164b generate clock pulses when signal points entered their associated regions. Hence, the signals $Ip\pm 1$, $Ip\pm 2$ $Iq\pm 1$ and $Iq\pm 2$ shown in FIG. 9 are derived from the signals $a_1$ to $a_4$. So far as a control circuit associated with imaginary number portions is concerned, it unlike a control circuit associated with real number portions does not become unable to converge even if error signals derived from a prior art circuit construction are used. Nevertheless, as shown in FIG. 9, the use of region discriminators 164a and 164b is effective to reduce the probability of incorrectness of error signals and, thereby, speed up the convergence.

The region discriminators 162a, 162b, 164a and 164b are furnished with a capability of restoring the function of a prior art control circuit when the demodulator 94 is in a normal state, i.e. when the carrier regenerator 124 is in a synchronous state. Specifically, when the reset signal R has disappeared, clock pulses are continuously delivered as signals X and Y so as to make the flip-flops 198 to 228 through with the result that the same control signals as in a prior art circuit are produced.

The advantage of the above-described construction is as follows. The region discriminators in this particular embodiment are capable of recovering the demodulation system even if the demodulator 94 is in an asynchronous state with input signals subjected to significant intersymbol interference. However, the number of signal points used as control signals is small; for example, in the case of 16 QAM system as shown in FIG. 10. only ¼ of the signal points is used. The proportion of the signal points used sequentially decreases as the number of levels of input signals is increased. Because a decrease in the proportion of signal points used is reflected by an increase in jitter which is contained in control signals, it is preferable that while the demodulator is normal, use is made of the prior art construction which prepares control signals using all the signals. Thus, in accordance with this embodiment the region discriminators operate nominally with the same construction as the prior art ones so long as the demodulator is in a normal state, as previously stated.

Figure 11A:
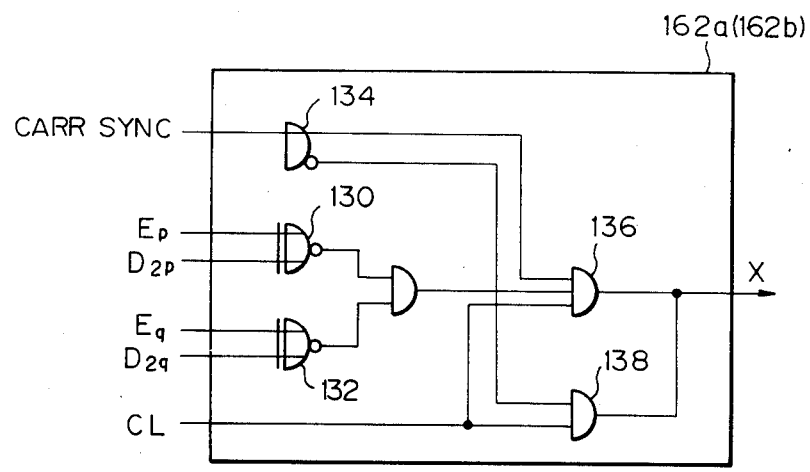
FIGS. 11A and 11B are diagrams each showing a specific construction of a region discriminator included in the embodiment of in FIG. 8.
Figure 11B:
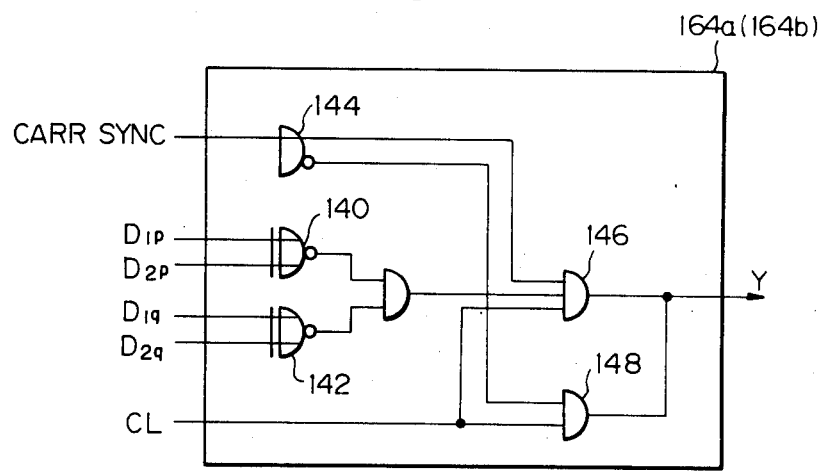

Referring to FIGS. 11A and 11B, specific constructions of the region discriminators 162a (162b) and 164a (164b) are shown. The region discriminator 162a (162b) comprises Ex-OR gates 130 and 132, an OR/NOR gate 134, and AND gates 136 and 138. The region discriminator 164a (164b), on the other hand, comprises Ex-OR gates 140 and 142, an OR/NOR gate 144, and AND gates 146 and 148. Because the construction of each region discriminator is relatively simple, detailed description thereof will be omitted.

Although this particular embodiment is applicable to high multi-level modulation systems having sixteen or more levels, too, an increase in the number of levels makes the number of signal points usable as control signals extremely small.

Figure 12:
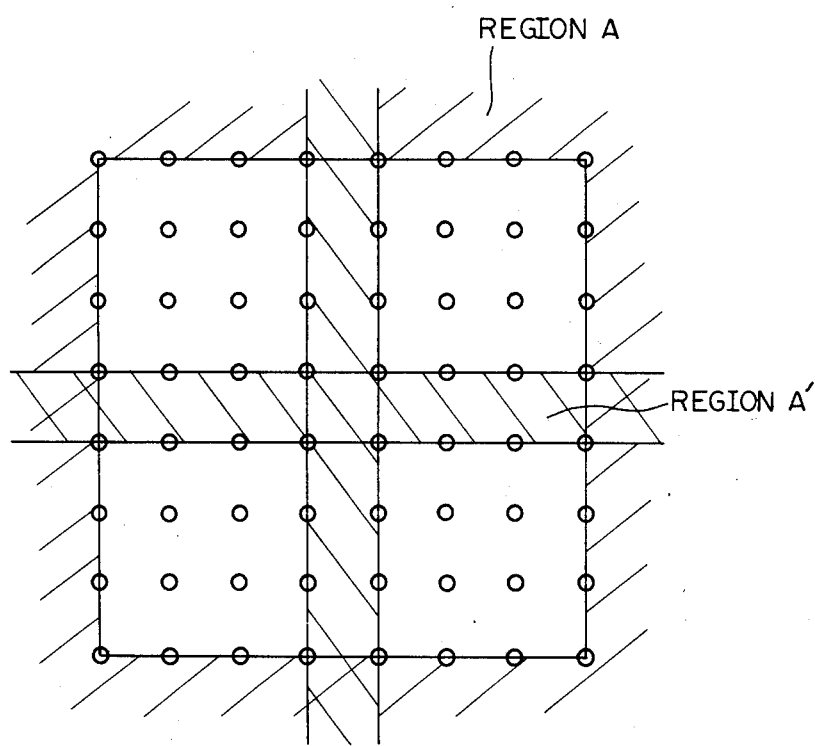
FIG. 12 shows an example of signal regions as decided by the discriminators in relation to a 64 QAM modulated wave.

Referring to FIG. 12, there is shown one example of discrimination regions which are associated with a real number portion control circuit for 64 QAM modulated waves. As shown, there are defined a signal region A which contacts the maximum level signals of demodulated signals P and Q from outside and a region A' which contacts the minimum level signals from inside. In this case, the regions are defined for each of P and Q. In this manner, the regions A and A' are adequately set up in matching relation to the number of levels and the arrangement of signal points.

While in FIG. 8 the transversal equalizer has been shown in relation to the IF band, use may be made of a baseband transversal equalizer, in which case the outputs of the weighting control signal generator will be directly applied to P and Q baseband transversal filters. Where this embodiment is applied to a high multi-level modulation wave having sixteen or more levels, what is required is simply increasing the number of bits of the AD converters 120 and 122 of FIG. 8 and modifying the regions to be discriminated by the discriminators 162a, 162b, 164a and 164b of FIG. 9. Further, the 5-taps transversal equalizer shown and described is only illustrative and may be replaced with another.

As described above, in accordance with the embodiment described above and elaborated to achieve the previously stated second object of the invention, the digital demodulation system is capable of being restored to normal even if a demodulator is in an asynchronous state and input signals involve significant intersymbol interference. This allows a transversal equalizer included in the system to fully exhibit an equalizing function thereof.

Various modifications will become possible for those skilled in the art after receiving the teachings of the present disclosure without departing from the scope thereof.

What is claimed is:

1. An automatic gain control circuit for controlling an input level of a multi-level discriminator to an optimum level to discriminate a multi-level baseband signal in terms of multiple levels, comprising:

a variable attenuator responsive to one of an intermediate frequency band or a baseband and interconnected to the multi-level discriminator for varying all input level of the discriminator;

identifying means for identifying in response to an output of the multi-level discriminator a first to a third regions which are set up in such a manner as to include outermost points and an innermost point with respect to a demodulated signal; and logic means for subjecting one of an output of said identifying means and an output of said identifying means which includes the multi-level discriminator to generate a control signal for controlling said variable attenuator.

2. A digital demodulation system which includes a demodulator and a transversal equalizer to demodulate a multi-level digital modulated wave for thereby producing a demodulator output which consists of main data signals and error signals, said system comprising:

decision means for deciding whether respective signal points of the multi-level digital modulated wave are positioned in regions A and A' which are predetermined in conformity to a state of signal point arrangement; and logic means for, in a carrier asynchronous state of the demodulator, logically manipulating an output of said decision means and an output of the demodulator to generate control signals for controlling respective taps of a real number portion of the transversal equalizer.

* * * * *

UNITED STATES PATENT AND TRADEMARK OFFICE
CERTIFICATE OF CORRECTION

PATENT NO.   :  4,703,282

DATED        :  October 27, 1987

INVENTOR(S)  :  Yoshida

It is certified that error appears in the above-identified patent and that said Letters Patent is hereby corrected as shown below:

COLUMN 2, LINE 24    After "A'" insert --which--;

COLUMN 2, LINE 37    After "circuits" delete ":", insert --;--;

COLUMN 3, LINE 11    After "circuit" delete ".", insert --,--;

COLUMN 3, LINE 12    Delete "Shown", insert --shown--;

COLUMN 6, LINE 68    Delete "$E_9^1$", insert --$E_9$--;

COLUMN 7, LINE 2     Delete "$a_{18}$", insert --$a_{16}$--;

COLUMN 7, LINE 3     Delete "$D^9$", insert --$D_{19}$--;

COLUMN 8, LINE 48    After "FIG. 10" delete "." insert --,--;

COLUMN 10 LINE 13    Delete "all" and insert --an--.

Signed and Sealed this

Fourth Day of April, 1989

Attest:

DONALD J. QUIGG

*Attesting Officer*         Commissioner of Patents and Trademarks